United States Patent [19]

Dretzka et al.

[11] Patent Number: 4,703,475
[45] Date of Patent: Oct. 27, 1987

[54] DATA COMMUNICATION METHOD AND APPARATUS USING MULTIPLE PHYSICAL DATA LINKS

[75] Inventors: Ellen E. Dretzka, Naperville; Zoe S. Quan, Chicago; Philip A. Schreiner, Naperville, all of Ill.

[73] Assignee: American Telephone and Telegraph Company AT&T Bell Laboratories, Murray Hill, N.J.

[21] Appl. No.: 805,304

[22] Filed: Dec. 4, 1985

[51] Int. Cl.[4] .......................... H04Q 11/04; H04J 3/24
[52] U.S. Cl. ......................................... 370/60; 370/94
[58] Field of Search ................... 370/60, 94, 110.1, 99

[56] References Cited

U.S. PATENT DOCUMENTS

| 4,516,238 | 5/1985 | Huang et al. | 370/94 |
| 4,527,267 | 7/1985 | Cohen | 370/94 |
| 4,550,404 | 10/1985 | Chodrow et al. | 370/110 |
| 4,569,042 | 2/1986 | Larson | 370/60 |
| 4,617,657 | 10/1986 | Drynan et al. | 370/94 |

OTHER PUBLICATIONS

CCITT Recommendation X.25 (1984) "Interface Between Data Terminal Equipment (DTE) and Data Circuit-Terminating Equipment (DCE) for Terminals Operating in the Packer Mode on Public Data Networks", See Section 2.5, pp. 39-49.
CCITT Recommendation X.75 (1984) "Terminal and Transmit Call Control Procedures and Data Transfer System on International Circuits Between Packet-Switched Data Networks", See Section 2.5, pp. 164-176.
A. S. Tanenbaum, "Virtual Circuits And Datagrams", Computer Networks, Prentice-Hall, Inc., 1981, See Section 5.1, pp. 187-196.

Primary Examiner—Douglas W. Olms
Assistant Examiner—Frank M. Scutch, III
Attorney, Agent, or Firm—Ross T. Watland

[57] ABSTRACT

A multi-link interprocessor communication protocol that allows a pair of processors to increase the speed of their communication by using multiple physical links in parallel. When a message is sent from one processor to another, the message is packetized into smaller segments and loaded onto the available physical links according to a simple algorithm. The individual packets are received at the other end, their accurate transmission verified, and the received packets are then reassembled in the proper order. Packets of one or more messages to the same destination can go over the same physical link, or over different physical links; that is, there is no association of any message to any particular physical communication link. Packets received out of order on a per logical channel basis are stored until a correct sequence of packets is received after which their transmission to the message destination is effected. The reordering of packets is accomplished using a multi-link header advantageously comprising only a single byte.

32 Claims, 20 Drawing Figures

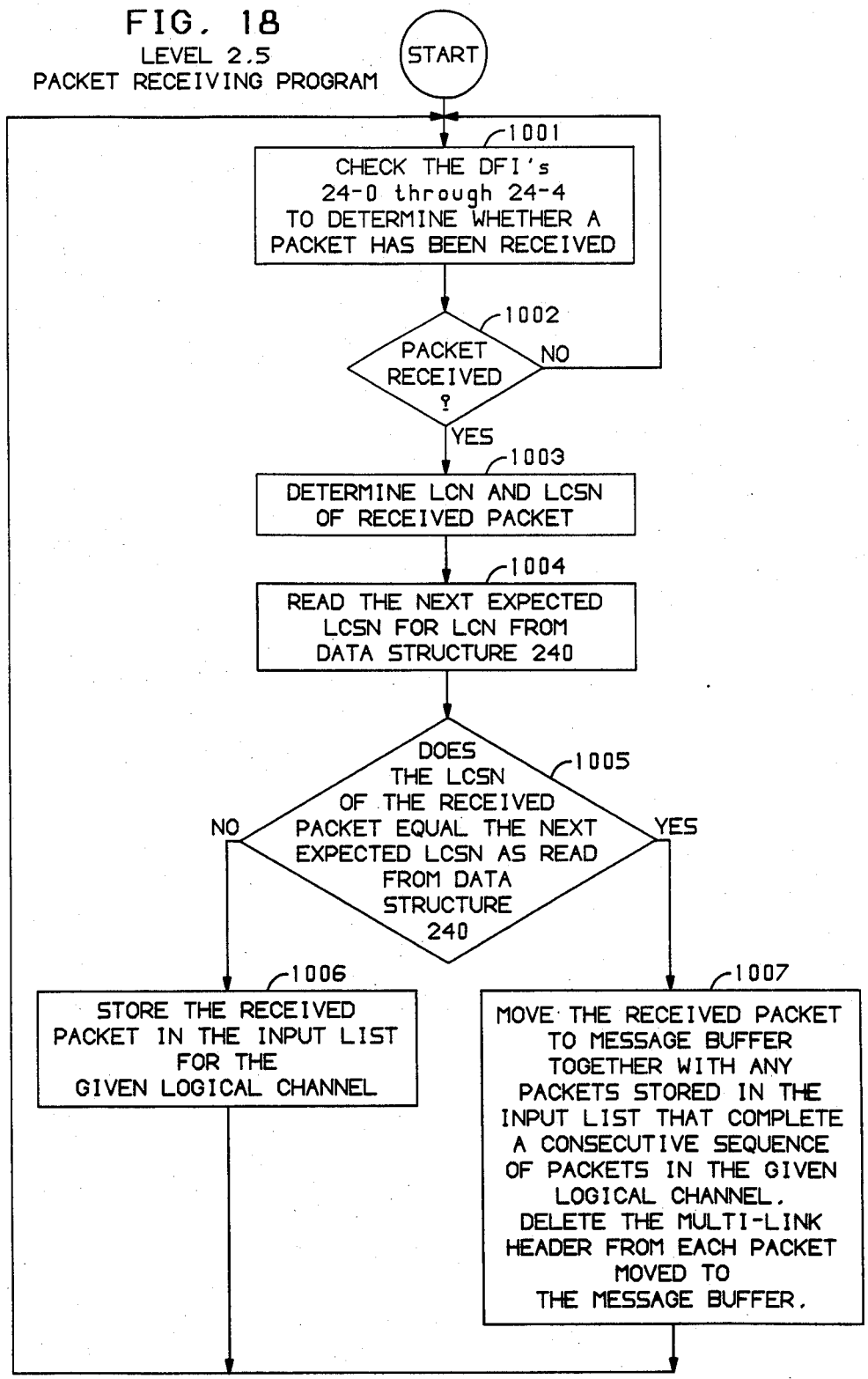

DATA COMMUNICATION METHOD AND APPARATUS USING MULTIPLE PHYSICAL DATA LINKS

TECHNICAL FIELD

This invention relates to data communication protocols, particularly to multi-link protocols that minimize the message overhead required to coordinate multi-link communication, and specifically to such protocols that minimize message delay by distributing message packets across a number of physical links and reordering received packets advantageously on a message or logical channel basis.

BACKGROUND OF THE INVENTION

Data communication protocols are becoming of ever increasing significance as the evolution to the Information Age continues. Such protocols are frequently defined using a layered approach based, at least in part, on the seven-layer Reference Model of Open System Interconnection (OSI) developed by the International Standards Organization (ISO). The principles applied by the ISO to arrive at the seven layers are listed in the text *Computer Networks,* (1981) by A. S. Tanenbaum as follows: (1) a layer should be created where a different level of abstraction is needed, (2) each layer should perform a well defined function, (3) the function of each layer should be chosen with an eye toward defining internationally standardized protocols, (4) the layer boundaries should be chosen to minimize the information flow across the interfaces, and (5) the number of layers should be large enough that distinct functions need not be thrown together in the same layer out of necessity, and small enough that the architecture does not become unwieldy.

Two of the most important data communication protocols at present are the X.25 and X.75 standard protocols promulgated by the International Telegraph and Telephone Committee (CCITT). The X.25 standard specifies the interface between data terminal equipment (DTE) and data circuit-terminating equipment (DCE) for terminals operating in the packet mode on public data networks. The X.75 standard defines the characteristics and operation of an interexchange signaling system for international packet-switched data transmission services. The two standards are similar in many respects and are being used, at least as guides, more generally in a wide variety of data communication applications.

The 1984 versions of both the X.25 and X.75 standards include multi-link procedures to be used when data communication packets are distributed across multiple physical links. The specified procedures in effect define an additional protocol layer between the packet layer 3 and the link-level layer 2 of those standards. The specified multi-link procedure requires a two-byte header including 12 bits for sequencing up to 4096 packets. The procedure uses a windowing mechanism where all transmitted packets are given a single sequence number, and some number of packets are sent (up to an agreed upon window size) without waiting for an acknowledgment from the receiving end. After the agreed-upon number of packets are sent, the transmitter waits until the oldest packet is acknowledged before rotating the window and transmitting more packets. On the receiving end, there is also a window of acceptable sequence numbers expected, with an additional guard region in which packets are accepted but errors are logged.

Although the multi-link procedures specified in the X.25 and X.75 standards perform their intended functions, they have several disadvantages in applications where: (1) the packet size is small and the overhead of a two-byte multi-link header is excessive and/or, (2) the required speed of reorganizing received packets into messages is greater than that afforded by the packet sequencing and windowing mechanism specified by the standards.

In view of the foregoing, two recognized problems in the art are the excessive multi-link overhead inherent in known multi-link procedures and the delays in delivering messages to their destination that result from adhering to those procedures.

SUMMARY OF THE INVENTION

The aforementioned problems are solved and a technical advance is achieved in accordance with the principles of the exemplary data communication method and apparatus of the present invention where packetized messages are transmitted in assigned logical channels advantageously with a logical channel sequence number included in a multi-link header for multiple link transmission of the packets. The multi-link header advantageously comprises by way of illustration, only a single byte. Significantly, a logical channel number of each of the packets is used for separation of different packets for individual processing even though they are concurrently receivable in any sequence from the multiple physical links. The logical channel sequence number is advantageously used for ordering the separated packets received from the plural links into a defined ordered sequence. Because of the separation by logical channel, processing of each of the logical channels does not interfere with or delay processing of the other logical channels and the packets are communicated to a desired destination in a correct sequence with minimal delays.

An illustrative method in accordance with the invention is used by program-controlled processors and memories for inter-module packetized communication in a communication switching system having a number of switching modules remotely located from a centrally located host switching system. Broadly, the illustrative method is used to convey information via a plurality of logical channels from a source to a destination having multiple physical links interposed therebetween The information to be conveyed is packetized into a number of packets each including a definition of one of the logical channels and a definition of a logical channel sequence number with respect to the defined logical channel. The packets are transmitted over the links in such manner that packets defining the same logical channel may be transmitted over different links, thus increasing the effective transmission speed of a given logical channel. (The effective transmission speed is increased approximately N times, if relatively long messages are uniformly distributed over N links.) Packets are received at the other end of the links and are separated by logical channel. The separated packets are then communicated to the destination in a defined ordered sequence according to logical channel sequence number even though the separated packets were received from the links in a different ordered sequence.

An exemplary method of processing a plurality of packets for transmission over multiple physical data links in accordance with the invention involves assigning the packets for transmission over the links, where each of the packets includes the definitions of a logical channel and a logical channel sequence number with respect to the defined logical channel. The assigned packets are then communicated to selectable ones of the links.

The delay in delivering information to the destination is minimized by treating each logical channel independently so that one lost packet in a given logical channel does not delay the delivery of information in each of the other logical channels. Further, packets received out of sequence in a given logical channel are delayed only until the next expected packet is received. More specifically, each of the separated packets that is received in sequence on a per logical channel basis is transmitted to the destination. Any of the separated packets that are received out of sequence on a per logical channel basis are temporarily stored. Stored packets are subsequently transmitted in the defined ordered sequence as is allowable when a delayed expected packet is finally received.

The multi-link header, which advantageously comprises only a single byte, includes, in addition to the logical channel sequence number discussed above, a link sequence number used to advantage at the receiving end of each of the links to determine whether the link is properly receiving packets in the same order they were transmitted.

The illustrative apparatus of the present invention includes an arrangement for the transmission of information via a number of logical channels from a source having multiple physical links extended therefrom. The arrangement includes a mechanism for packetizing the information into packets each including a definition of one of the logical channels and a definition of a logical channel sequence number with respect to the defined logical channel. The arrangement also includes an assigning means that assigns packets for transmission over the links in such manner that packets defining the same logical channel are transmittable over different links.

The illustrative apparatus of the present invention also includes an arrangement for processing packetized information received in a plurality of logical channels on multiple physical links. The arrangement includes means for separating packets received from the links according to logical channel. The arrangement then orders the separated packets in a defined sequence according to logical channel sequence numbers included in the packets. The ordered packets of each logical channel are then transmitted to the desired destination.

The invention is illustrated herein by a multi-layer communication system having a number of logical channels and having multiple physical communication links. The system includes at the transmitting end, a packet layer for dividing source information into packets each defining one of the logical channels, and further includes multiple link layers each associated with one of the links for receiving packets from the transmitting end packet layer and enclosing the received packets in frames for transmission over the associated link. The system includes at the receiving end, multiple link layers each associated with one of the links for receiving frames from the associated link and extracting packets therefrom, and, in addition, includes a receiving end packet layer for receiving packets from the receiving end link layers to reform the source information. In accordance with the exemplary method of the invention, logical channel sequence numbers are included in each packet passed from the transmitting end packet layer to the transmitting end link layers. Packets passed from the receiving end link layers to the receiving end packet layer are first ordered on a per logical channel basis based on the logical channel sequence numbers included in those packets.

The illustrative multi-layer communication system further includes session layers at both the transmitting and receiving ends. Message sequence numbers are included in messages passed from the transmitting end session layer to the transmitting end packet layer. Then at the receiving end session layer, a determination is made of whether the message sequence number of a message received from the receiving end packet layer is within an allowable range of message sequence numbers. By narrowing the allowable range of message sequence numbers to one, the system can implement strict message sequencing if desired.

An illustrative switching arrangement embodying the present invention includes first and second switching means each including means for establishing switched-connections and control means for controlling the establishing means. A number of physical links interconnect the first and second control means. The first switching means packetizes information into packets each including a definition of a logical channel and a definition of a logical channel sequence number with respect to the defined logical channel. The first switching means transmits the packets over the links in such manner that packets defining the same logical channel may be transmitted over different links. The second switching means receives packets on the links and separates them by logical channel. The second control means is responsive to packets received in at least one of the logical channels for controlling the second establishing means.

BRIEF DESCRIPTION OF THE DRAWING

A more complete understanding of the invention may be obtained from a consideration of the following description when read in conjunction with the drawing in which:

FIG. 18 is a flow chart representing a program executed when receiving packets from multiple physical links and efficiently reordering received packets in the manner of the present invention.

DETAILED DESCRIPTION

Figure 1:
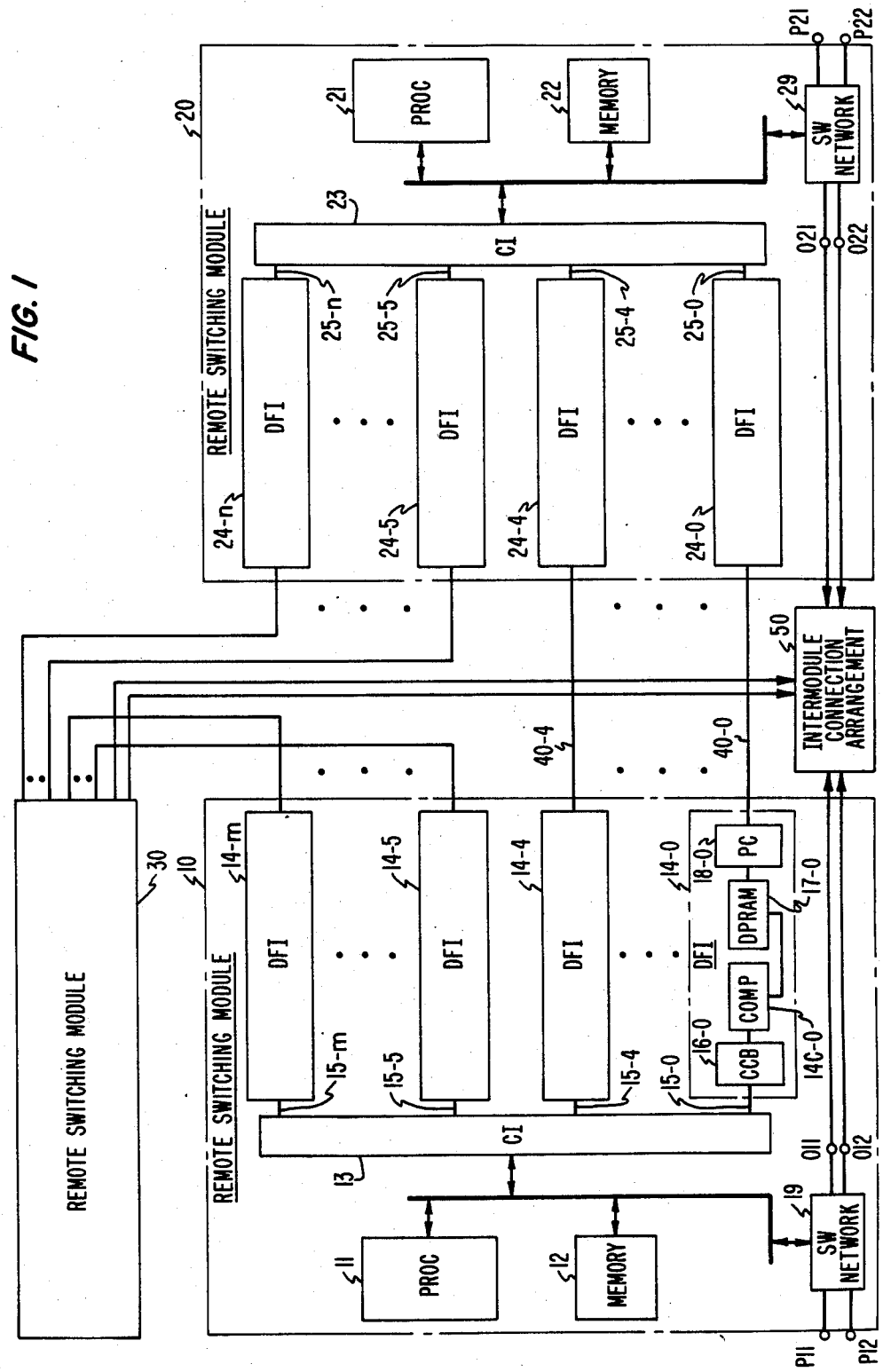
FIG. 1 is a diagram of an arrangement or cluster of three remote switching modules interconnected by multiple physical links where the illustrative data communication method and apparatus of the present invention is used as the interprocessor control communication mechanism for the arrangement.
Figure 12:
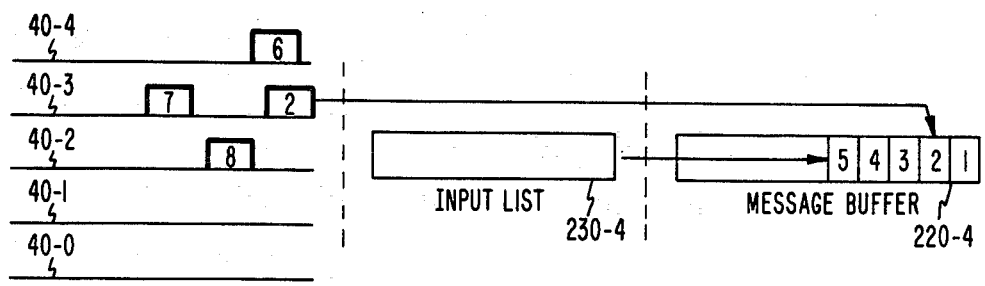
Figure 13:
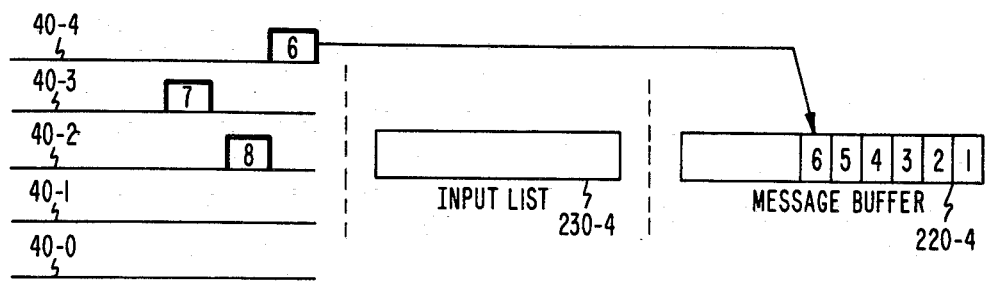

FIG. 1 is a diagram of three remote switching modules 10, 20 and 30 interconnected in a grouping referred to herein as a cluster. The operation of such a cluster of remote switching modules in cooperation with a host switching system is disclosed in U.S. Pat. No. 4,550,404 of M. M. Chodrow et al., issued Oct. 29, 1985. However, since the context of the present invention deals with only the stand-alone mode of operation of the cluster of remote switching modules 10, 20 and 30, no host switching system is shown in FIG. 1. As in the Chodrow patent, the remote switching modules are interconnected by bidirectional transmission facilities such as the T1 carrier system disclosed in the J. H. Green et al., U.S. Pat. No. 4,059,731 (although simplification of the transmission facilities is possible where the remote switching modules are co-located). Such transmission facilities are referred to in the present application as physical links. In contrast to the exemplary embodiment disclosed in the Chodrow patent, each pair of remote switching modules is interconnected by multiple physical links. For example, remote switching modules 10 and 20 are interconnected by five physical links 40-0 through 40-4. As shown in FIGS. 12 and 13 of the Chodrow patent, each remote switching module includes a number of line units, a time-slot interchange unit, a control unit, and a facilities interface unit including among other things a plurality of digital facility interfaces. In FIG. 1 of the present application, the arrangement comprising processor 11, memory 12, and control interface 13 corresponds to control unit 517 in FIG. 12 of the Chodrow patent. The control busses 15-0 through 15-$m$ in FIG. 1 of the present application correspond to the communication path 527 in FIG. 12 of the Chodrow patent. The digital facility interface 14-0 in FIG. 1 of the present application corresponds to digital facility interface 581 in FIG. 13 of the Chodrow patent. However, since multiple physical links interconnect pairs of remote switching modules in the context of the present invention, remote switching module 10 has a total of five digital facility interfaces to interface the five physical links 40-0 through 40-4 to remote switching module 20. Remote switching module 10 further includes digital facility interfaces 14-5 through 14-$m$ to interface the physical links to remote switching module 30. The line units, time-slot interchange unit and portions of the facilities interface unit of the remote switching modules shown in FIG. 12 of the Chodrow patent are shown more generally, in remote switching module 10 in FIG. 1 of the present application, as a switching network 19 providing connections to lines and trunks via ports such as P11 and P12 and interconnecting with other remote switching modules via outlets such as 011 and 012 and an intermodule connection arrangement 50. Arrangement 50 represents the portions of the bidirectional transmission facilities interconnecting remote switching modules that are used to convey inter-module voice and data traffic in the Chodrow patent.

Figure 19:
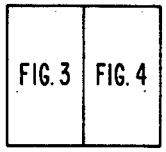
FIG. 19 is the combination of FIG. 3 and FIG. 4.
Figure 20:
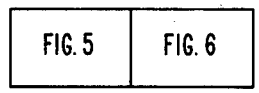
FIG. 20 is the combination of FIG. 5 and FIG. 6.

The present invention deals with the communication between processors such as the processors 11 and 21 of remote switching modules 10 and 20. As discussed in the Chodrow patent, such inter-processor communication is effected using only certain ones of the 193rd bits of 193-bit frames conveyed on the T1-carrier-like physical links, using a mechanism referred to as a derived data link and described in U.S. Pat. No. 4,245,340 issued to J. E. Landry. Significant to the present invention, of the 1.544-megahertz bandwidth available on one of the physical links, the derived data link on one physical link operates at only 4.0 kilobits per second. Because the present invention deals primarily with the inter-processor communication, digital facility interface 14-0 in FIG. 1 of the present application is shown as only including a control communication buffer (CCB) 16-0, a computer 14C-0, a dual port random access memory (DPRAM) 17-0, and a protocol controller (PC) 18-0, those devices collectively corresponding to the message formatter and computer shown in FIG. 19 of the Chodrow patent. The other components of the digital facility interface shown in FIG. 19 of the Chodrow patent do not relate to the inter-processor communication mechanism and are not shown in digital facility interface 14-0 of FIG. 1 of the present application.

Remote switching module 20 is similar to remote switching module 10 in most respects. Processor 21, memory 22, and control interface 23 correspond to processor 11, memory 12, and control interface 13 of remote switching module 10. Switching network 29, ports P21 and P22, and outlets 021 and 022 correspond to switching network 19, ports P11 and P12, and outlets 011 and 012 in remote switching module 10. Since remote switching module 20 has $n+1$ physical links emanating therefrom as opposed to $m+1$ links for remote switching module 10, remote switching module 20 includes $n+1$ control busses 25-0 through 25-$n$ and $n+1$ digital facility interfaces 24-0 through 24-$n$.

As discussed in the Chodrow patent, the control communication between processors 11 and 21 is used, for example, to control the establishment of switched-connections by switching network 29. Such control communication is conveyed in at least one of a plurality of logical channels between processors 11 and 21.

Figure 2:
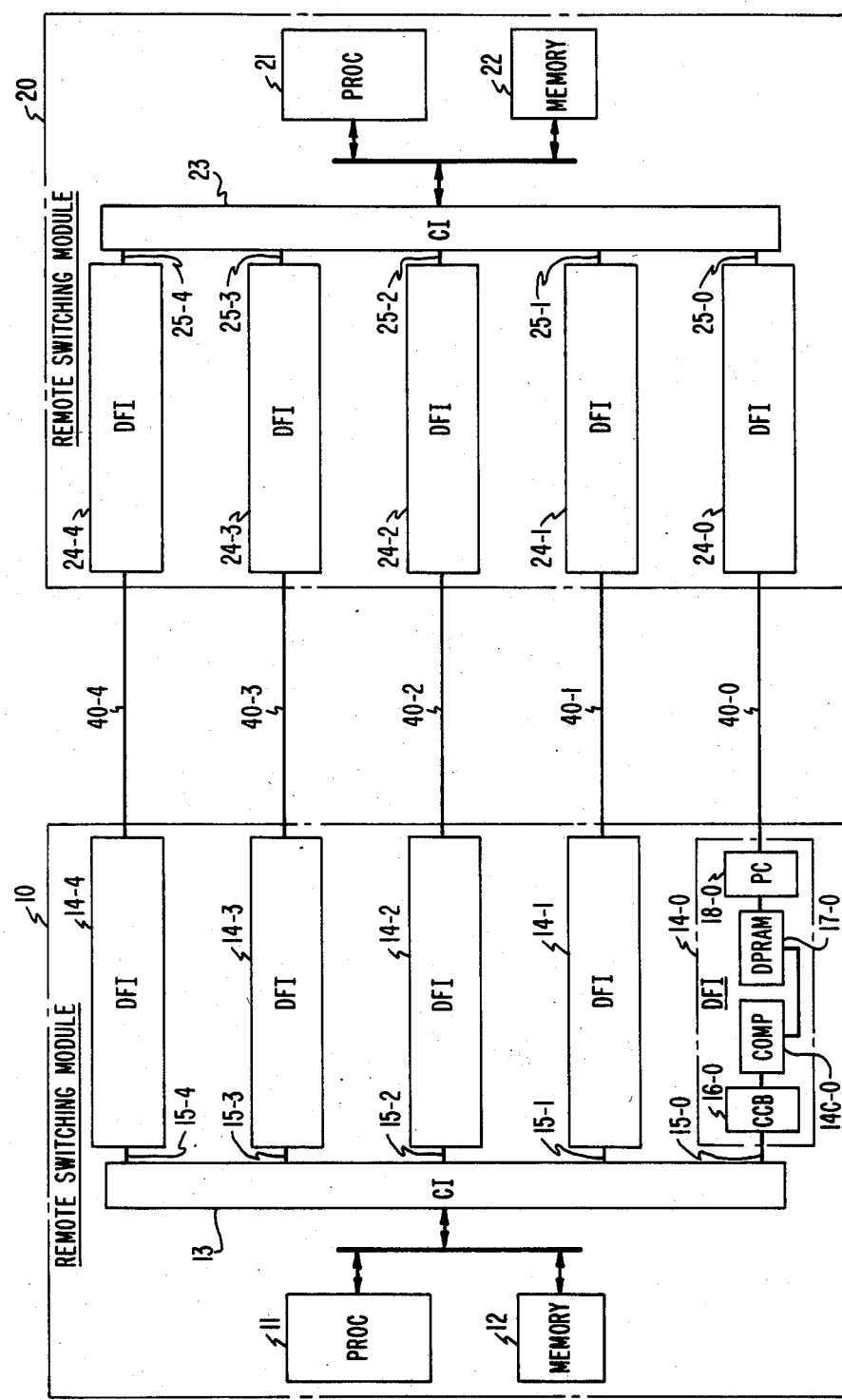
FIG. 2 represents a modification of FIG. 1 showing portions of two of the remote switching modules and the multiple physical links therebetween.

Since the present invention relates primarily to the communication between a single pair of processors, the elements shown in FIG. 1 relating to remote switching module 30 and communication therewith, the switching networks 19 and 29 of remote switching modules 10 and 20, and inter-module connection arrangement 50 have been deleted from a modification of FIG. 1 shown as FIG. 2.

Although the communication between processors 11 and 21 is of course bidirectional, the description which follows concentrates primarily on the communication of information via messages from processor 11, via the multiple physical links 40-0 through 40-4, to processor 21. The functional operation for the other direction of transmission, i.e. from processor 21 to processor 11, is substantially identical. The messages to be transmitted by processor 11 result from the execution of application programs stored in memory 12. Such application programs are referred to herein as the message source. The messages transmitted to processor 21 are ultimately used during the execution of application programs stored in memory 22. The latter application programs are referred to herein as the message destination.

Figure 3:
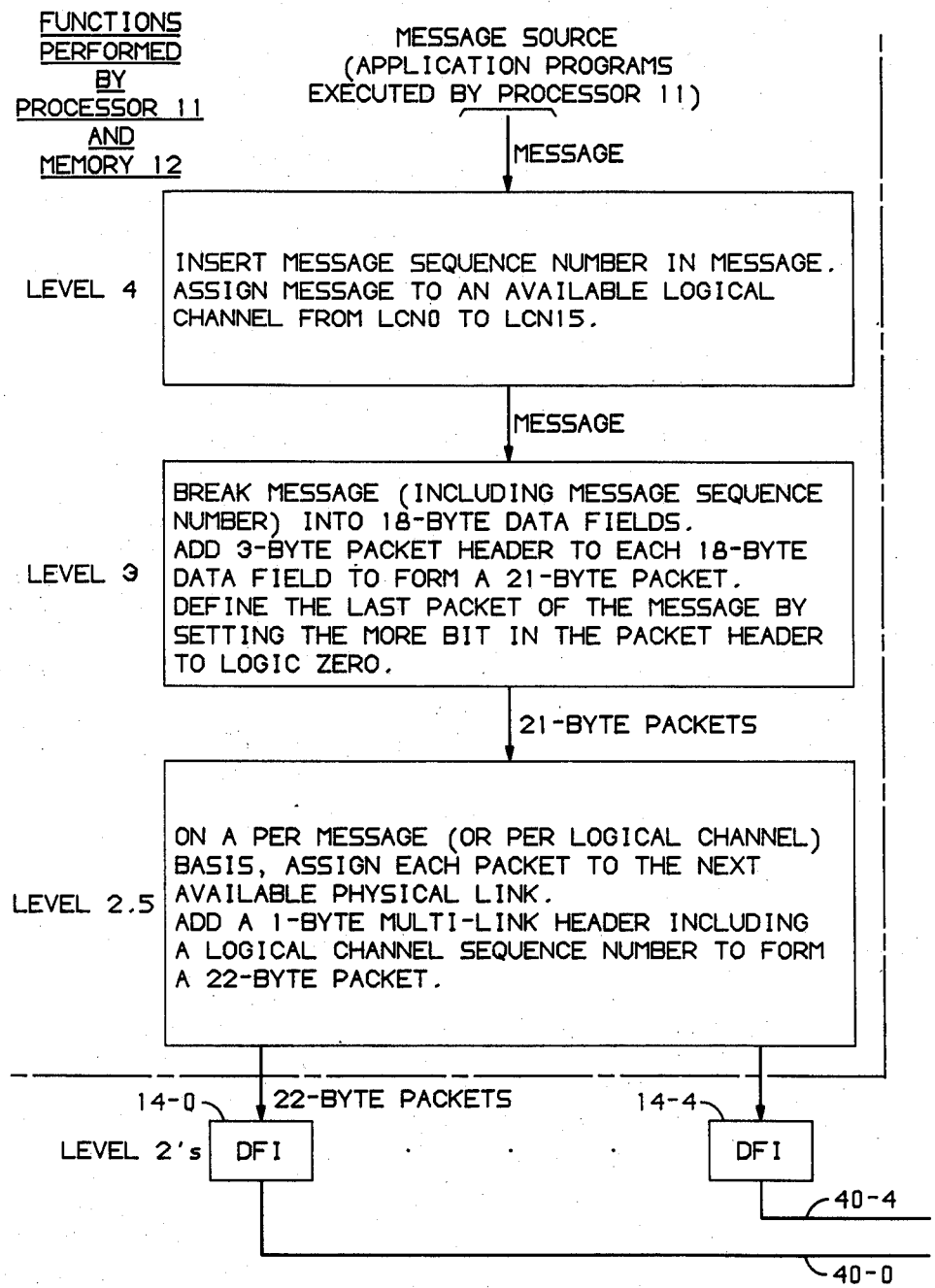
FIGS. 3 and 4, when arranged in accordance with FIG. 19, present a multi-layer data communication model for the exemplary method of the present invention.
Figure 4:
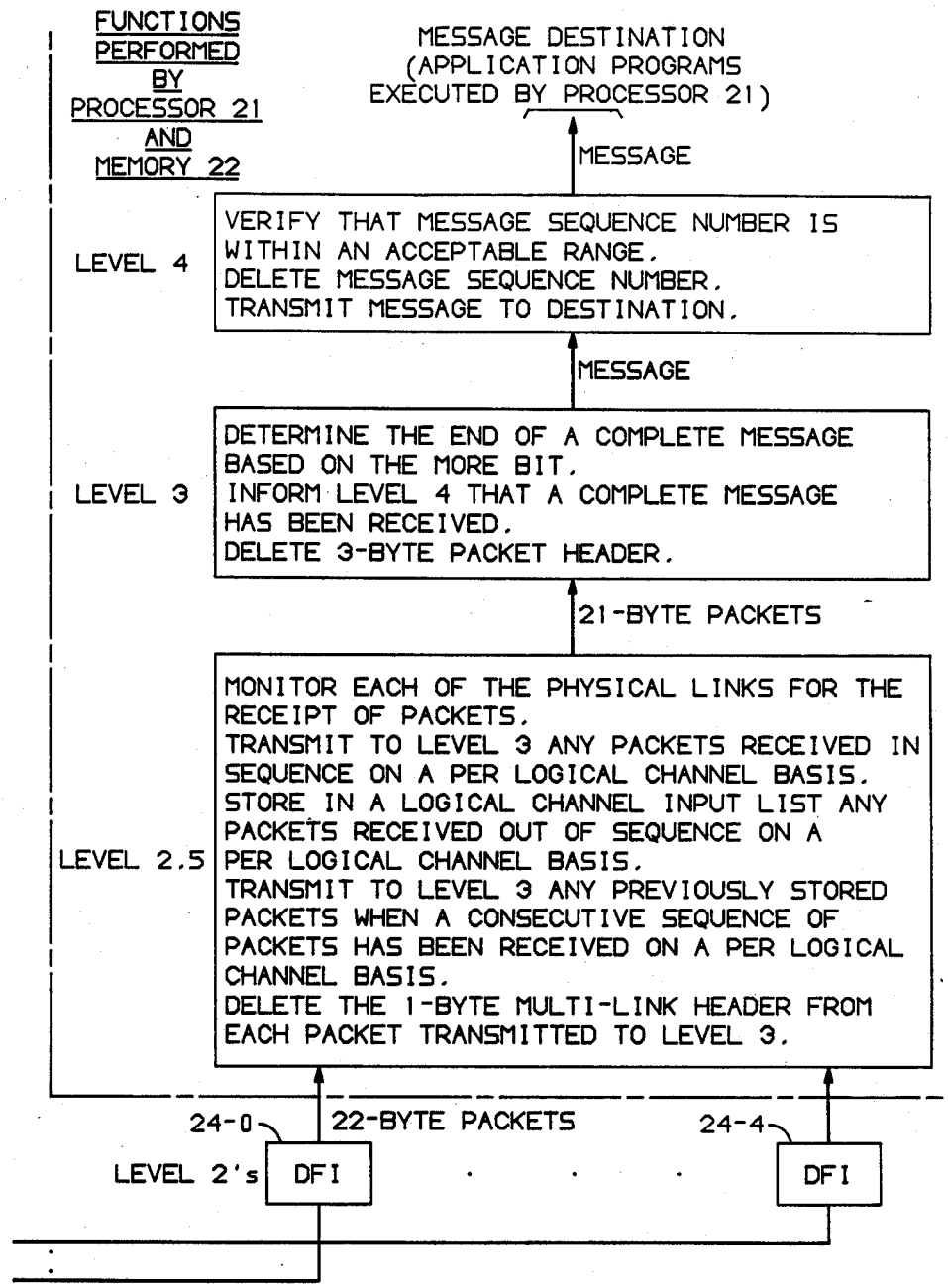

As is well known, data communication is frequently structured using a multi-layer model. Such a multi-layer model for the exemplary method of the present invention is shown in FIGS. 3 and 4. The functions described within the boxes labelled level 4, level 3, and level 2.5 of FIG. 3 are software-implemented, i.e., they are performed by processor 11 in cooperation with memory 12. (The words layer and level are used interchangeably herein.) Similarly, the functions described within the boxes labelled level 4, level 3, and level 2.5 of FIG. 4 are also software-implemented, being performed by processor 21 in cooperation with memory 22. The remainder of the multi-layer model of FIGS. 3 and 4 defines functions which are hardware or firmware-implemented using the hardware and firmware components of the digital facility interfaces 14-0 through 14-4 and 24-0 through 24-4 to perform the level 2 or link-level functions, and using the physical links 40-0 through 40-4 to perform the level 1 or physical level functions.

Starting from the message source, which comprises an application program executing on processor 11, a message is delivered to level 4, referred to herein as the session level. Level 4 inserts a message sequence number into the message, assigns the message to an available logical channel, e.g., logical channel LCN4, and passes the resulting message to level 3, referred to herein as the packet level. Level 3 breaks the message (including the inserted message sequence number) into 18-byte data fields. (Of course, the final data field of the message may contain fewer than 18 bytes.) Level 3 also adds a three-byte packet header (shown in FIG. 17 and described later herein) which among other things defines the assigned logical channel LCN4. The addition of the three-byte packet header to the packet results in a 21-byte packet. Level 3 also defines the last packet of the message by appropriately setting the MORE bit included in the packet header of the last packet. Level 3 passes its 21-byte packets on to level 2.5, referred to herein as the multi-link level.

Figure 16:
FIG. 16 shows the one-byte multi-link header used in accordance with the method of the invention to minimize the message overhead devoted to coordination of the multi-link communication.

Level 2.5 sequentially assigns each packet of the message to the next available one of the physical links 40-0 through 40-4. Level 2.5 also adds a one-byte multi-link header to each 21-byte packet to form a 22-byte packet. (The packets are limited to 22 bytes due to memory limitations in the digital facility interfaces.) The multi-link header (FIG. 16) includes a five-bit logical channel sequence number LCSN defining the sequential order of the packets of the message, or equivalently, the sequential order of the packets in the logical channel LCN4 to which the message has been assigned. The multi-link header further includes a three-bit DFI sequence number, DFISN, defining the sequential order of packets transmitted on a given one of the DFIs 14-0 through 14-4. The DFISN is also referred to herein as the link sequence number. The 22-byte packets are then sequentially passed to the appropriate DFIs 14-0 through 14-4.

The DFIs 14-0 through 14-4 enclose the 22-byte packets in link-level frames including flag, address, control, and frame check sequence fields in accordance with a well-known link-level protocol, for example, HDLC or X.25 level 2, and transmit the frames on the physical links 40-0 through 40-4 to the DFIs 24-0 through 24-4 of remote switching module 20. The DFIs 24-0 through 24-4 extract the 22-byte packets from the received level 2 frames. Level 2.5 is monitoring the DFIs 24-0 through 24-4 for the receipt of packets. When level 2.5 determines that a packet has been received by a given DFI, it inspects the LCN included in the packet header and the LCSN included in the multi-link header and determines whether the received packet is the next expected packet in the particular logical channel, LCN4 in the present example. If level 2.5 determines that the received packet is the next expected one, it deletes the one-byte multi-link header and passes the resulting 21-byte packet to level 3. If level 2.5 determines on the other hand that the received packet is not the next expected packet, it stores the packet in a logical channel input list. Level 2.5 continues to store packets received in LCN4 in the logical channel input list until the next expected packet is received. Once the next expected packet is received and the multi-link header is deleted therefrom, the resulting 21-byte packet is passed to level 3, and the multi-link headers are deleted from any packets stored in the logical channel input list which, starting with the received expected packet, complete a consecutive sequence of packets of the message. The resulting 21-byte packets are passed in sequential order to level 3. Thus the packets of the message in LCN4, even though they may be received out of sequential order, are passed to level 3 in the correct sequential order and are delayed in storage by level 2.5 only for the time required to receive the next expected packet in the particular logical channel LCN4.

Level 3 stores the packets in message buffers and inspects the MORE bit in the packet headers to determine the last packet of a message. Once the final packet of the message has been received by level 3, level 4 is informed that a message has been received and the three-byte packet headers are deleted from the packets. The 18-byte data fields are then passed in correct sequential order to deliver the originally transmitted message (including the message sequence number) to level 4. Level 4 verifies that the message sequence number is within a predefined acceptable range, deletes the message sequence number from the message and passes the resulting message to the message destination which, as previously indicated, is an application program executed by processor 21 in cooperation with memory 22.

Figure 5:
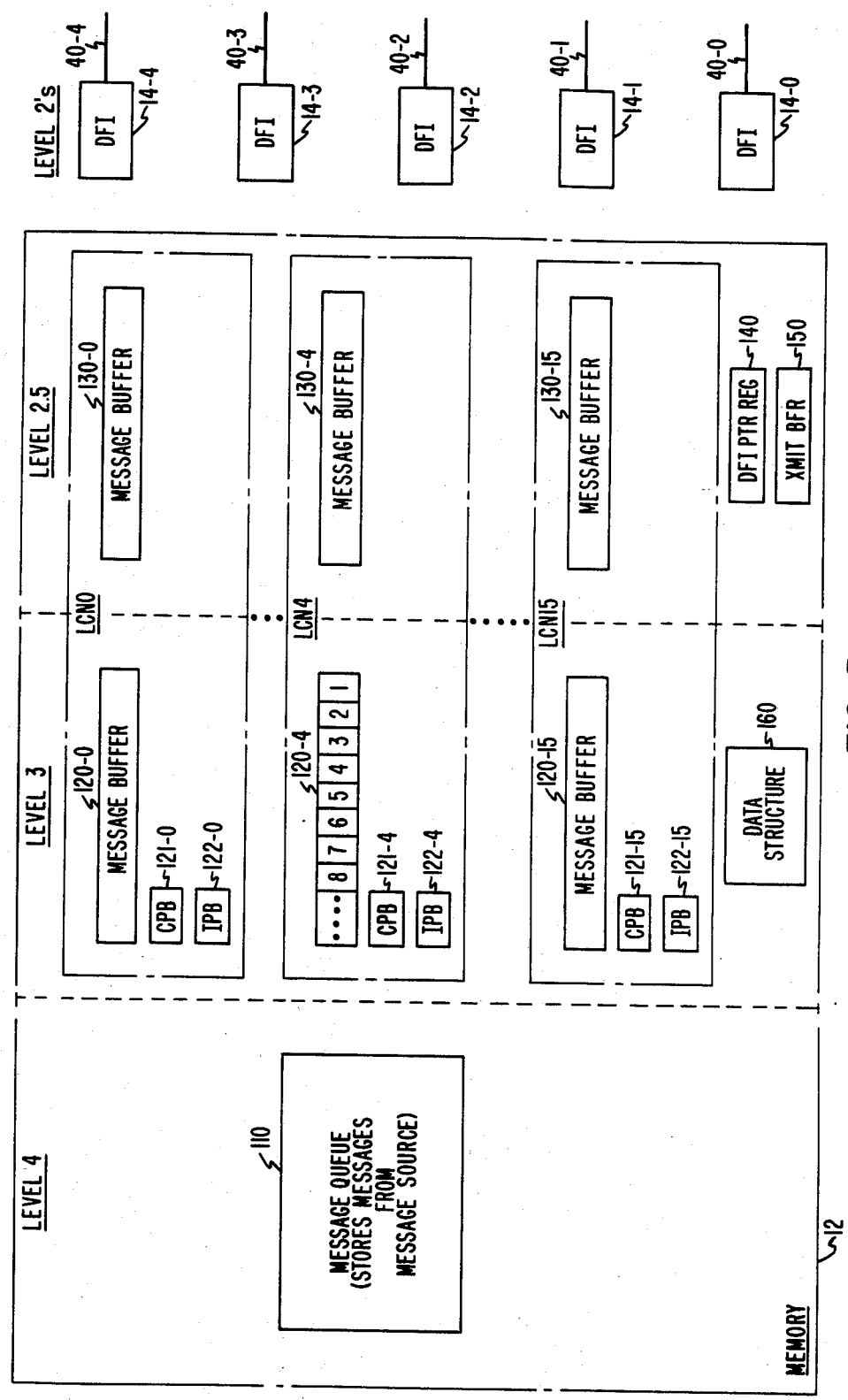
FIGS. 5 and 6, when arranged in accordance with FIG. 20, show the internal structure of memories 12 and 22 in more detail as well as the multiple physical links and interfaces therebetween.
Figure 6:
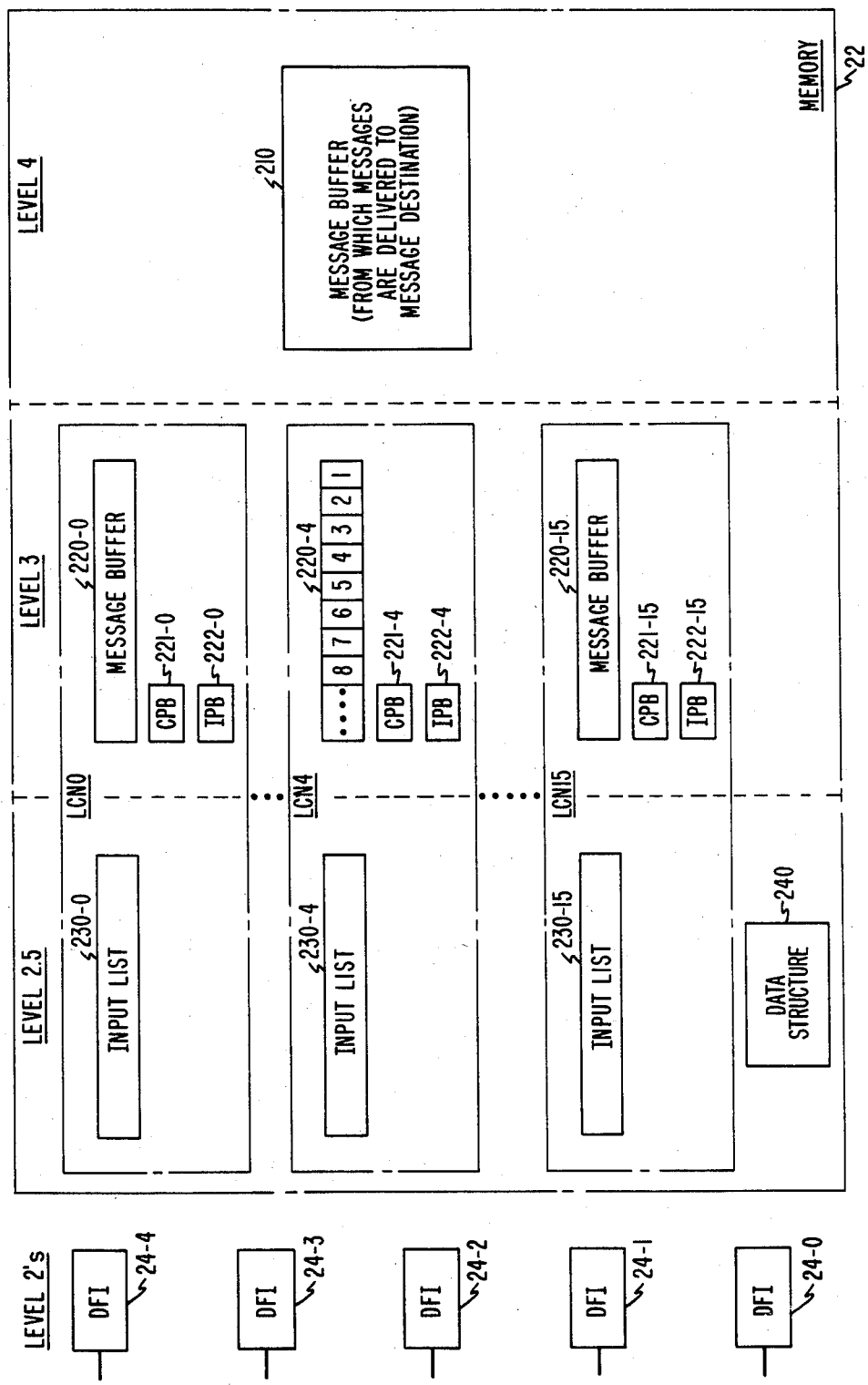

FIGS. 5 and 6 illustrate an exemplary arrangement of memory 12 and memory 22 structures together with the DFIs 14-0 though 14-4, the physical links 40-0 through 40-4, and the DFIs 24-0 through 24-4 interposed between remote switching modules 10 and 20. Memory 12 includes a message queue 110 in which processor 11 stores messages (including inserted message sequence numbers) to be transmitted to processor 21. Within its real-time limitations, processor 11 assigns the messages in message queue 110 to available ones of the 16 logical channels. When a given message is passed to level 3, processor 11 breaks the given message up into 18-byte data fields, adds a three-byte packet header to each 18-byte data field to form 21-byte packets, and moves the 21-byte packets to the one of 16 message buffers 120-0 through 120-15 at level 3 corresponding to the assigned logical channel for the given message. For example, if the given message is assigned to logical channel LCN4, the 21-byte packets are passed to the corresponding message buffer 120-4. When processor 11 determines that it is now time to transmit the message in message buffer 120-4, the packets of the message are moved to the corresponding one of 16 message buffers 130-0 through 130-15 at level 2.5, in the present example, message buffer 130-4 corresponding to the assigned logical channel LCN4. Memory 12 also includes a DFI pointer register 140 which is maintained to define the next available one of the DFIs 14-0 through 14-4. If, for example, DFI 14-4 is defined as the next available DFI, the first packet of the message stored in message buffer 130-4 will be transmitted via DFI 14-4. The one-byte multi-link header will be added to the packet to form a 22-byte packet before the packet is transmitted from message buffer 130-4 to DFI 14-4. Recall that the one-byte multi-link header includes a five-bit LCSN field. The multi-link header also includes a three-bit DFISN field which would define a number one greater (using modulo-8 addition) than the last packet transmitted by DF 14-4. Memory 12 includes a data structure 160 that stores the next LCSN for each LCN and the next DFISN for each DFI. If the next available DFI is then defined by DFI pointer register 140 as DFI 14-3, the second packet of the message including the added multi-link header will be transmitted by DFI 14-3. The process continues until all of the packets of the message have been transmitted. In this exemplary embodiment, messages are transmitted one at a time—in other words all of the packets of the message in message buffer 130-4 are transmitted (up to a window size of seven) to the DFIs before the transmission of packets of a message in a different message buffer (i.e., a message assigned to a different logical channel). Since in the present embodiment, it takes approximately 10 milliseconds for the CCB (FIG. 1) in a given DFI to accept a packet, it is desirable for efficiency reasons not to transmit two consecutive packets on the same DFI. Memory 12 further includes a transmit buffer 150. If for any reason, none of the DFIs 14-0 through 14-4 are available at the time a packet is to be transmitted from one of the message buffers 130-0 through 130-15, the packet is moved to transmit buffer 150 and is transmitted therefrom when a DFI does become available to receive a packet.

Memory 22 includes 16 input lists 230-0 through 230-15 at level 2.5, and 16 message buffers 220-0 through 220-15 at level 3, the input lists and message buffers corresponding to the 16 logical channels LCN0 through LCN15. Processor 21 monitors the DFIs 24-0 through 24-4 to determine when a packet is received thereby. A data structure 240 is maintained to define for each of the 16 logical channels, the LCSN of the next packet expected in that logical channel. Data structure 240 also stores the next expected DFISN for each of the DFIs 24-0 through 24-4. For example, when the first packet of the above-mentioned message in logical channel LCN4 is received by DFI 24-4, processor 21 reads the LCN in the packet header and the LCSN in the multi-link header of the received first packet and determines two things: (1) since the LCSN=00000 defines the next expected packet in agreement with the entry in data structure 240 for LCN4, the packet should be moved directly to a message buffer rather than being stored in an input list, and (2) since the LCN in the packet header defines LCN4, the packet should be moved to the message buffer 220-4 corresponding to LCN4. If the LCSN of the received packet did not agree with the expected LCSN as defined by data structure 240, the packet would be stored in input list 230-4 until the next expected packet is received in LCN4. Once the next expected packet is received, any packets stored in input list 230-4 that complete a consecutive sequence of packets, are moved to message buffer 220-4. Of course, the one-byte multi-link headers are removed before the packets are stored in message buffer 220-4. Once processor 21 at level 3 determines by reading the MORE bit of the packet header, that the last packet of a message is present is message buffer 220-4, processor 21 effects a transfer of each of the packets of the message (minus the three-byte packet headers) to a message buffer 210 from which the message is delivered to the message destination, i.e., an application program being executed by processor 21.

In addition to inspecting the LCN and LCSN of each received packet, processor 21 at level 2.5 also compares the DFISN of the received packet with the next expected DFISN for a given DFI as defined in data structure 240. Each packet received out of order on a per-link or per-DFI basis is considered as an error which is reported by processor 21 level 2.5 to a higher-level system integrity program of processor 21. The error is logged and the total number of errors on the link compared with a predetermined threshold. When the threshold is exceeded, various system recovery actions may be effected including removing the particular link and its associated DFI from service.

Memory 12 further includes for each logical channel at level 3, a control packet buffer (CPB) and an interrupt packet buffer (IPB). For example, for logical channels LCN0, LCN4 and LCN15, CPBs 121-0, 121-4 and 121-15, and IPBs 122-0, 122-4, and 122-15 are included. If processor 12 stores a control packet in CPB 121-4, for example, that control packet is transmitted on one of the physical links 40-0 through 40-4 before any data packets that may be present in message buffer 120-4 are transmitted. The control packets are used to perform such functions as resetting or flow controlling a logical channel. Control packets stored in CPB 121-0 for LCN0 are used to perform functions such as resetting all logical channels or the entire plurality of DFIs and physical links interposed between remote switching modules 10 and 20. (In fact, in the present embodiment logical channel LCN0 is used exclusively for such control packets for all the physical links and is never used to convey normal inter-processor messages.) If processor 12 stores an interrupt packet in IP8 122-4, that interrupt packet is transmitted before any data packets but after a control packet stored in CP8 121-4. The interrupt packet is used, for example, to reset the message sequence numbering at both ends of the communication. Memory 12 has corresponding CPBs 221-0, 221-4, and 221-15, and IPBs 222-0, 222-4, and 222-15, for receiving such control and interrupt packets such that processor 12 can formulate the appropriate response to the receipt of such packets.

The operation of the exemplary method of the invention may be better understood by considering the following example. A message comprising eight packets is transmitted from processor 11 to processor 21 using logical channel LCN4. The eight packets are shown in FIG. 5 in message buffer 120-4 of memory 12 as boxes numbered consecutively from 1 through 8. At the completion of the example, the eight packets will reside in message buffer 220-4 of memory 22 as is shown in FIG. 6 as boxes numbered consecutively from 1 through 8.

Figure 7:
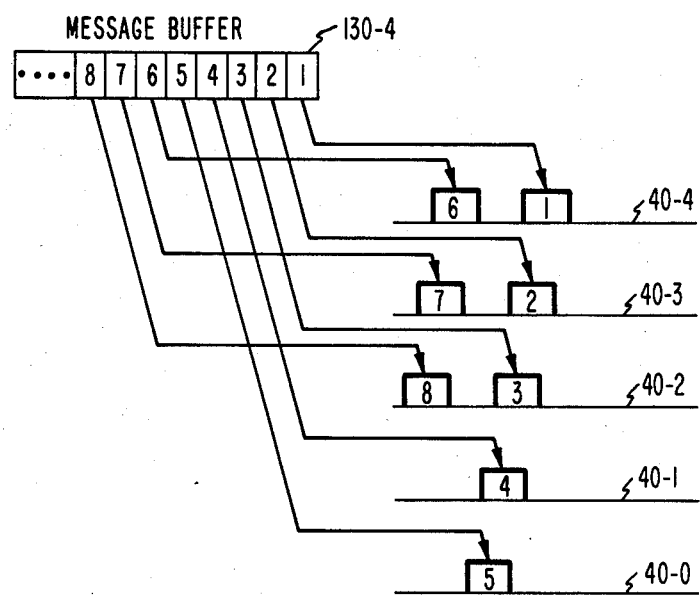
FIG. 7 is a diagram showing the transmission of the packets of an eight-packet message on the multiple physical links of FIGS. 5 and 6 illustrating a typical distribution of packets over the links.
Figure 8:
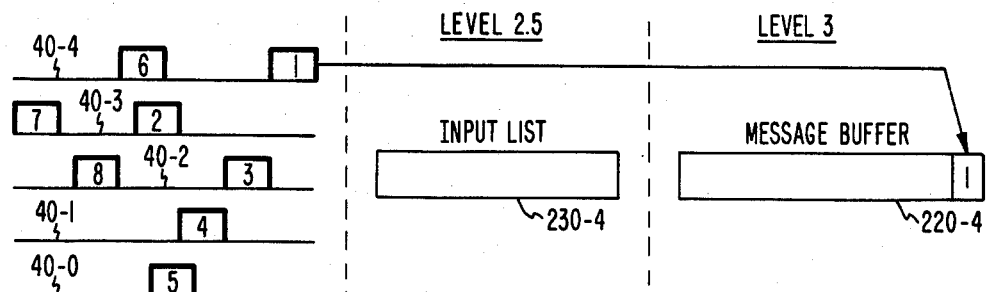
FIGS. 8 through 15 illustrate the sequential reception of the eight packets of the message of FIG. 7 highlighting the advantageous reordering of packets on a per message or per logical channel basis and the minimal delay in transmitting reordered packets to their destination occasioned when one of the physical links is operating slightly slower than the others.
Figure 9:
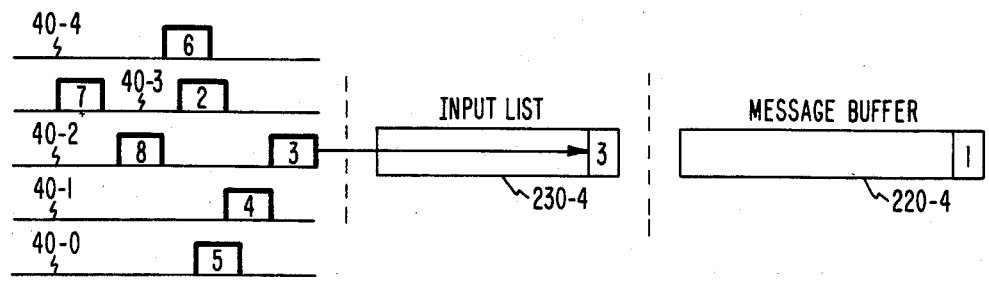
Figure 10:
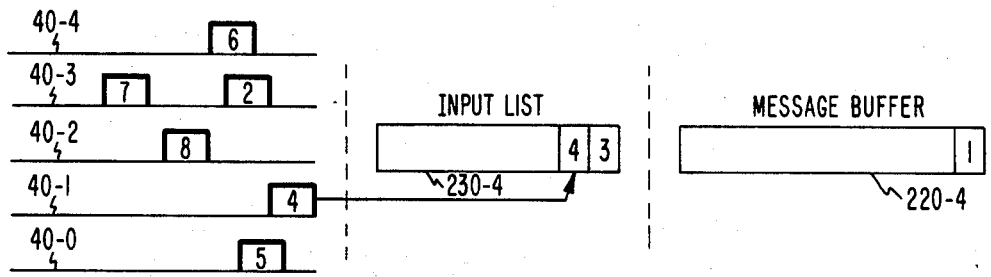
Figure 11:
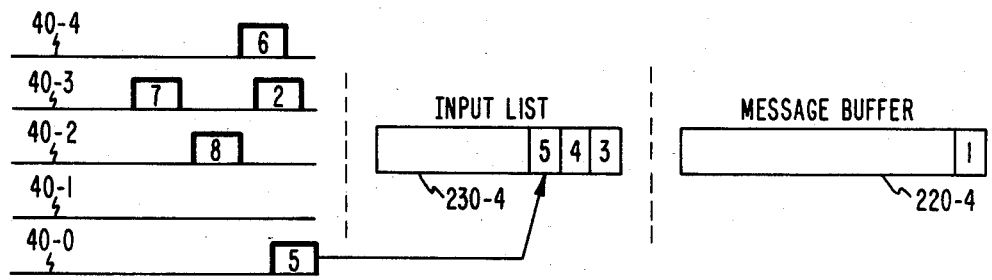
Figure 14:
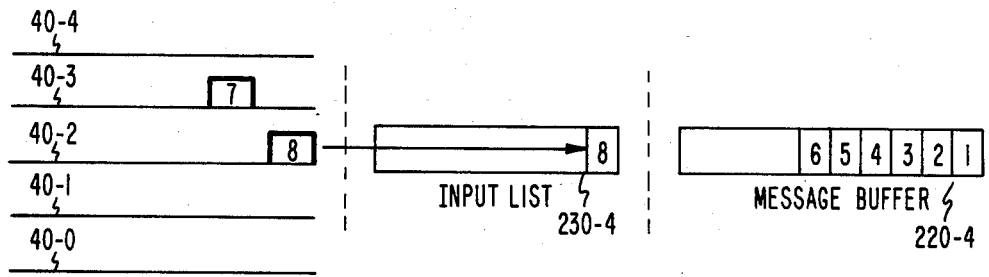
Figure 15:
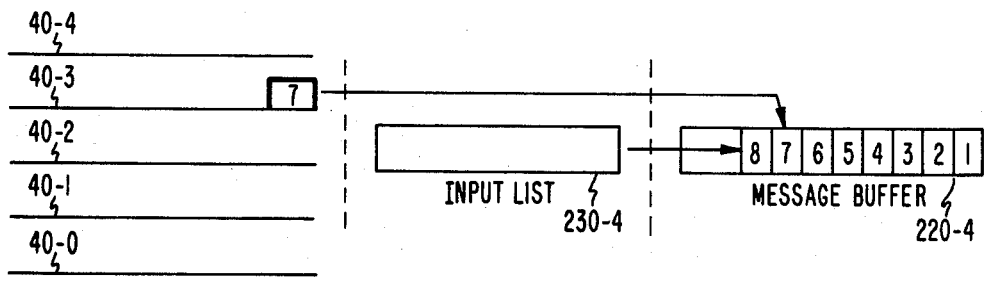

As has already been discussed, the first step of the process involves the movement of the eight 21-byte packets from message buffer 120-4 to message buffer 130-4 (FIG. 7). Assume for simplicity that the packets 1, 2, 3, 4, 5, 6, 7, and 8 are transmitted on links 40-4, 40-3,

40-2, 40-1, 40-0, 40-4, 40-3, and 40-2 respectively, as shown in FIG. 7. Assume further that for some reason the packets transmitted on link 40-3 require slightly longer to traverse the link than packets transmitted on the other links. Thus the temporal sequence of the eight packets after traversing the links 40-0 through 40-4 is as shown in FIG. 8. When packet 1 is received, it is moved immediately to message buffer 220-4 since it is the next packet expected in logical channel LCN4. However, when packet 3 is received ahead of packet 2, it is stored in input list 230-4 (FIG. 9). Similarly, when packet 4 is received and packet 2 still has not been received, packet 4 is stored in input list 230-4 (FIG. 10). Again, when packet 5 is received and packet 2 still has not been received, packet 5 is also stored in input list 230-4 (FIG. 11). When packet 2 is finally received, it is immediately moved to message buffer 220-4 behind packet 1 (FIG. 12). However, packets 3, 4 and 5 which complete a consecutive sequence of packets are also moved from input list 230-4 behind packet 2 in message buffer 220-4. When the next expected packet, packet 6, is received, it is immediately moved behind packet 5 in message buffer 220-4 (FIG. 13). Then when packet 8 is received before packet 7, packet 8 is stored in input list 230-4 rather than being moved directly to message buffer 220-4 (FIG. 14). Finally, when the next expected packet in LCN4, packet 7, is received, it is moved immediately behind packet 6 in message buffer 220-4 (FIG. 15). In addition, packet 8 which completes a consecutive sequence of packets is also moved from input list 230-4 behind packet 7 in message buffer 220-4.

A flow chart of the program executed by processor 21 at level 2.5 is shown in FIGS. 18. Execution begins with block 1001 where a check is made of each of the DFIs 24-0 through 24-4 to determine whether a packet has been received. Execution proceeds to decision block 1002 and a branch occurs depending on whether a received packet was found during block 1001. If no received packet was found, execution returns to block 1001 and each of the DFIs 24-0 through 24-4 is again checked. On the other hand, if a received packet was detected during the execution of block 1001, execution proceeds to block 1003 where the LCN and the LCSN of the received packet are determined. Execution proceeds to block 1004 and the next expected LCSN for that LCN is read from data structure 240. Execution proceeds to decision block 1005 where a determination is made of whether the received packet is, in fact, the next expected packet in that logical channel. If it is, execution proceeds to block 1007. In block 1007, three functions are performed: (1) the received packet is moved to the message buffer, (2) any packets stored in the input list that complete a consecutive sequence of packets in the given logical channel, are also moved to the message buffer, and (3) the one-byte multi-link header is deleted from each packet moved to the message buffer. If a negative determination is made in decision block 1005, execution proceeds to block 1006 and the received packet is stored in the input list for the given logical channel. From either of the blocks 1006 or 1007, execution returns to block 1001 and the process repeats as long as the data communication method of the invention continues in operation.

Figure 17:
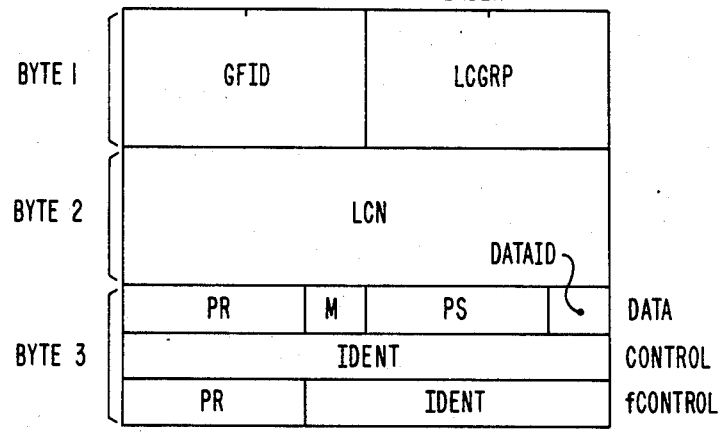
FIG. 17 shows the standard three-byte packet header used at level 3 in the illustrative data communication method.

The three-byte packet header shown in FIG. 17 is the standard BX.25 packet header. (The BX.25 standard is described in the *Bell Laboratories Record* of November 1982.) The LCGRP field of the first byte and the second LCN byte taken together define the logical channel number of the packet (in the present example only four bits of the LCN are required to define the 16 logical channels). The field definitions of the third byte of the packet header vary depending on whether the packet is a data packet (identified as such as by the DATAID field), a control packet (the type of control packet being identified by the IDENT field), or a flow control packet (the type of packet again being identified by the IDENT field). Interrupt packets are considered to be one type of control packet in this format. The only other field of interest in the present application is the M or MORE bit which is set to define the last packet of a message.

The portion of digital facility interface 14-0 (FIG. 1) used to effect derived data link communication includes CCB 16-0, computer 14C-0, DPRAM 17-0 and PC 18-0. PC 18-0 provides for the level 2 communication between DFIs and is responsible for ensuring the integrity of the frames which are sent back and forth over the physical links. PC 18-0 provides full duplex serial data transmission. DPRAM 17-0 is accessed both by PC 18-0 and by computer 14C-0 to read and write the data portion of the level 2 frames. DPRAM 17-0 can store eight incoming and eight outgoing messages. CCB 16-0 is used for communication between computer 14C-0 and processor 11. CCB 16-0 has 62 registers for communication in each direction. Processor 11 accesses the registers by communicating over control bus 15-0 via control interface 13. One of the registers in each direction is used to indicate a derived data link service request. The actual bytes of the message are stored in other CCB 16-0 registers. Thus one of the 22-byte packets discussed herein is written by processor 11 to CCB 16-0. Computer 14C-0 transfers the packet from CCB 16-0 to a buffer in DPRAM 17-0. PC 18-0 then reads the buffer in DPRAM 17-0 and transmits the level 2 frame over the physical link.

Processor 11, e.g., a Motorola 68000 processor, and the associated memory 12 (as well as the corresponding processor 21 and memory 22 in remote switching module 20) cooperate under the control of various programs stored in memory 12 to perform at different times during the operation of the exemplary system, the specialized functions described herein such as packetizing information, assigning packets to selectable physical links, separating received packets by logical channel, and ordering the separated packets by logical channel sequence number.

In an alternative embodiment, the resources of memories 12 and 22 are used more efficiently by an implementation where each packet need only be stored once in a given memory (as opposed to storage in multiple message buffers) and the various packet manipulations are effected using pointers.

It is to be understood that the above-described embodiment is merely illustrative of the principles of the invention and that other variations may be devised by those skilled in the art without departing from the spirit and scope of the invention. For example, in the illustrative method described herein, all the packets of a first logical channel are transmitted before the packets of the next logical channel. However, packet transmission need not be sequential by logical channel. For example, as an alternative, the first packet of each logical channel could be transmitted followed by the second packet of each logical channel, and so on. Further, the invention is not limited to communication protocols defining logical channels. Instead, units of information can be conveyed in accordance with the invention by packetizing the units of information and using unit identifications and packet sequence numbers rather than logical channels and logical channel sequence numbers to order received packets in a defined ordered sequence.

What is claimed is:

1. A method of conveying information via a plurality of logical channels from a source to a destination having multiple physical links interposed therebetween, said method comprising packetizing said information into a plurality of packets each including therein a definition of one of said logical channels and a definition of a logical channel sequence number with respect to the defined logical channel, transmitting said plurality of packets over said links in such manner that ones of the packets defining the same logical channel are transmittable over different ones of said links, separating a plurality of packets received on said links, according to logical channels defined therein, and communicating said separated packets to said destination in a defined ordered sequence according to logical channel sequence numbers defined therein, and wherein said communicating step comprises communicating said separated packets receivable from said links in an ordered sequence different from said defined ordered sequence.

2. A method in accordance with claim 1 wherein said communicating step comprises transmitting to said destination, each of said separated packets received in said defined ordered sequence, storing any of said separated packets received out of said defined ordered sequence, and transmitting to said destination, previously stored packets which are now transmittable in said defined ordered sequence.

3. A method for the transmission of an information message via a plurality of logical channels from a source having multiple physical links extended therefrom, said method comprising packetizing said information message into a plurality of packets each including therein a definition of one of said logical channels and a definition of a logical channel sequence number with respect to the defined logical channel, and assigning said plurality of packets for transmission over said links in such manner that ones of the packets defining the same logical channel are transmittable over different ones of said links.

4. A method of processing packetized information received in a plurality of logical channels on multiple physical links, said method comprising separating packets received from said links according to logical channels defined within said received packets, and ordering said separated packets in a defined sequence according to logical channel sequence numbers within said separated packets.

5. A method in accordance with claim 4 further comprising transmitting to a destination, each of said separated packets received in said defined sequence, storing any of said separated packets received out of said defined sequence, and transmitting to said destination, previously stored packets which are now transmittable in said defined sequence.

6. A method of conveying information from a source to a destination having multiple physical links interposed therebetween, said method comprising assigning a message to be transmitted by said source, to one of a plurality of logical channels, packetizing said message into a plurality of packets each having a header defining the logical channel assigned to said message, adding a second header defining a logical channel sequence number to each of the packets of said message, transmitting the packets of said message over said links in such manner that ones of the packets of said message are transmittable over different ones of said links, monitoring each of said links for the receipt of packets, transmitting to said destination, each of the packets of said message received on said links in sequence on a per logical channel basis as defined by the logical channel sequence numbers included in those packets, storing any packets of said message received on said links out of sequence on a per logical channel basis as defined by the logical channel sequence numbers included in those packets, and transmitting to said destination any previously stored packets of said message which, from a given packet of said message transmitted to said destination, complete a consecutive sequence of packets of said message.

7. A method in accordance with claim 6 wherein said second header comprises at most one byte.

8. A method in accordance with claim 6 wherein said assigned message includes a message sequence number, and wherein one of said plurality of packets is defined as the last packet of said message, said method further comprising detecting the receipt from said links of the last packet of said message, and determining whether the message sequence number of said message is within an allowable range of message sequence numbers.

9. A method in accordance with claim 6 wherein said transmitting the packets of said message over said links step comprises assigning the packets of said message to available ones of said links and transmitting each of the packets of said message on its assigned link, wherein said second header further defines a link sequence number for each packet transmitted on a given one of said links, and wherein said monitoring step comprises determining whether the packets received on each of said links are in order on a per link basis as defined by the link sequence numbers included in those packets.

10. A method in accordance with claim 9 wherein said second header comprises at most one byte.

11. In a multi-layer communication system having a plurality of logical channels and having multiple physical communication links, said system comprising at the transmitting end a packet layer for dividing source information into packets each defining one of said logical channels, and multiple link layers each associated with one of said links for receiving packets from said transmitting end packet layer and enclosing the received packets in frames for transmission over the associated link; and said system comprising at the receiving end multiple link layers each associated with one of said links for receiving frames from the associated link and extracting packets therefrom and, a packet layer for receiving packets from said receiving end link layers to reform said source information at the receiving end, a method of conveying said source information comprising including a logical channel sequence number in each packet passed from said transmitting end packet layer to said transmitting end link layers and ordering on a per logical channel basis based on logical channel sequence numbers, the packets passed from said receiving end link layers to said receiving end packet layer.

12. A method in accordance with claim 11 wherein said system further comprises at the transmitting end a session layer for passing messages, comprising source information and including message sequence numbers, to said transmitting end packet layer, said system further comprising at the receiving end a session layer for receiving messages comprising packets passed from said receiving end packet layer, and wherein said method further comprises determining whether the message sequence numbers of the messages received by said receiving end session layer are within an allowable range of message sequence numbers.

13. A method in accordance with claim 11 further comprising including a link sequence number in each packet passed from said transmitting end packet layer to each one of said transmitting end link layers, and determining whether the packets extracted by each of said receiving end link layers are in order as defined by the link sequence numbers included in those packets.

14. An arrangement for conveying information via a plurality of logical channels from a source to a destination having multiple physical links interposed therebetween, said arrangement comprising means for packetizing said information into a plurality of packets each including therein a definition of one of said logical channels and a definition of a logical channel sequence number with respect to the defined logical channel, means for transmitting said plurality of packets over said links with ones of the packets defining the same logical channel being transmittable over different ones of said links, means for receiving a plurality of packets on said links, means for separating said received packets according to the logical channels defined therein, and means cooperating with said separating means for ordering the separated packets according to the logical channel sequence numbers defined therein.

15. An arrangement in accordance with claim 14 further comprising means responsive to the ordering of said separated packets for transmitting the ordered packets of each logical channel to said destination.

16. An arrangement in accordance with claim 14 further comprising means for transmitting to said destination, each of said separated packets received in sequence on a per logical channel basis as defined by the logical channel sequence numbers included in those packets, means for storing any of said separated packets that were received out of sequence on a per logical channel basis as defined by the logical channel sequence numbers included in those packets, and means for transmitting to said destination, previously stored packets which are now transmittable in sequence on a per logical channel basis as defined by the logical channel sequence numbers included in those packets.

17. An arrangement for the transmission of information via a plurality of logical channels from a source having multiple physical links extended therefrom, said arrangement comprising means for packetizing said information into a plurality of packets each including therein a definition of one of said logical channels and a definition of a logical channel sequence number with respect to the defined logical channel and means for assigning said plurality of packets for transmission over said links in such manner that ones of the packets defining the same logical channel are transmittable over different ones of said links.

18. An arrangement for processing packetized information received in a plurality of logical channels on multiple physical links, said arrangement comprising means for separating packets received from said links according to logical channels defined within said received packets, and means for ordering said separated packets in a defined sequence according to logical channel sequence numbers defined within said separated packets.

19. An arrangement in accordance with claim 18 further comprising means responsive to the ordering of said separated packets for transmitting the ordered packets of each logical channel to a destination.

20. An arrangement in accordance with claim 19 further comprising means for transmitting to said destination, each of said separated packets received in sequence on a per logical channel basis as defined by logical channel sequence numbers included in those packets, means for storing any of said separated packets received out of sequence on a per logical channel basis as defined by logical channel sequence numbers included in those packets and means for transmitting to said destination, previously stored packets which are now transmittable in sequence on a per logical channel basis as defined by the logical channel sequence numbers included in those packets.

21. A switching arrangement comprising first switching means comprising first means for establishing switched-connections between a first plurality of ports and between said first plurality of ports and at least one outlet connected to an intermodule connection arrangement, and first control means for controlling said first establishing means, second switching means comprising second means for establishing switched-connections between a second plurality of ports and between said second plurality of ports and at least one outlet connected to said intermodule connection arrangement, and second control means for controlling said second establishing means, and a plurality of physical links interconnecting said first and second control means wherein said first switching means further comprises means for packetizing information into a plurality of packets each including therein a definition of one of a plurality of logical channels and a definition of a logical channel sequence number with respect to the defined logical channel, means for transmitting said plurality of packets over said links with ones of the packets defining the same logical channel being transmittable over different ones of said links, and wherein said second switching means further comprises means for receiving a plurality of packets on said links, and means for separating said received packets according to the logical channels defined therein, and wherein said second control means is responsive to packets received in at least one of said logical channels for controlling said second establishing means.

22. A switching arrangement in accordance with claim 21 wherein said second switching means further comprises means for packetizing information into a second plurality of packets each including a definition of a second plurality of logical channels and a definition of a logical channel sequence number with respect to the defined logical channel, means for transmitting said second plurality of packets over said links with ones of the packets defining the same logical channel being transmittable over different ones of said links, and wherein said first switching means further comprises means for receiving a plurality of packets on said links, and means for separating said packets received by said receiving means of said first switching means according to the logical channels defined therein, and wherein said first control means is responsive to packets received in at least one of said second plurality of logical channels for controlling said first establishing means.

23. A program-controlled digital switching system having a plurality of remote switching modules and having an inter-processor packetized communication arrangement for communication among said remote switching modules used for conveying information via a plurality of logical channels from one remote switching module to another remote switching module having multiple physical data links interposed therebetween, said arrangement comprising in said one remote switching module, means for packetizing said information into a plurality of packets each including therein a definition of one of said logical channels and a definition of a logical channel sequence number with respect to the defined logical channel, and said arrangement comprising in said another remote switching module, means for receiving a plurality of packets on said links, means for separating said received packets according to the logical channels defined therein and means cooperating with said separating means for ordering the separated packets according to the logical channel sequence numbers defined therein.

24. A method of processing a plurality of packets for transmission over multiple physical data links comprising assigning said plurality of packets for transmission over said links, wherein each of said plurality of packets includes therein a definition of one of said logical channels and a definition of a logical channel sequence number with respect to the defined logical channel, and communicating said assigned packets to selectable ones of said links.

25. A method of conveying units of information from a source to a destination having multiple physical links interposed therebetween, said method comprising packetizing said units of information into a plurality of packets each including therein a definition of a unit identification and a definition of a packet sequence number with respect to the defined unit identification, transmitting said plurality of packets over said links in such manner that ones of the packets included in the same unit of information are transmittable over different ones of said links, separating a plurality of packets received on said links, according to the unit identifications defined therein, and communicating said separated packets to said destination in a defined ordered sequence according to packet sequence numbers defined therein, and wherein said communicating step comprises communicating said separated packets receivable from said links in an ordered sequence different from said defined ordered sequence.

26. A method in accordance with claim 25 wherein said communicating step comprises transmitting to said destination, each of said separated packets received in said defined ordered sequence, storing any of said separated packets received out of said defined ordered sequence, and transmitting to said destination, previously stored packets which are now transmittable in said defined ordered sequence.

27. A method for the transmission of units of information from a source having multiple physical links extended therefrom, said method comprising packetizing said units of information into a plurality of packets each including therein a definition of a unit identification and a definition of a packet sequence number with respect to the defined unit identification, and assigning said plurality of packets for transmission over said links in such manner that ones of the packets included in the same unit of information are transmittable over different ones of said links.

28. A method of processing packetized information received on multiple physical links, said method comprising separating packets received from said links according to unit identifications defined within said received packets, and ordering said separated packets in a defined sequence according to packet sequence numbers within said separated packets.

29. A method in accordance with claim 28 further comprising transmitting to a destination, each of said separated packets received in said defined sequence, storing any of said separated packets received out of said defined sequence, and transmitting to said destination, previously stored packets which are now transmittable in said defined sequence.

30. An arrangement for conveying units of information from a source to a destination having multiple physical links interposed therebetween, said arrangement comprising means for packetizing said units of information into a plurality of packets each including therein a definition of a unit identification and a definition of a packet sequence number with respect to the defined unit identification, means for transmitting said plurality of packets over said links with ones of the packets included in the same unit of information being transmittable over different ones of said links, means for receiving a plurality of packets on said links, means for separating said received packets according to the unit identifications defined therein, and means cooperating with said separating means for ordering the separated packets according to the packet sequence numbers defined therein.

31. An arrangement for the transmission of units of information from a source having multiple physical links extended therefrom, said arrangement comprising means for packetizing said units of information into a plurality of packets each including therein a definition of a unit identification and a definition of a packet sequence number with respect to the defined unit identification and means for assigning said plurality of packets for transmission over said links in such manner that ones of the packets included in the same unit of information are transmittable over different ones of said links.

32. An arrangement for processing packetized information received on multiple physical links, said arrangement comprising means for separating packets received from said links according to unit identifications defined within said received packets, and means for ordering said separated packets in a defined sequence according to packet sequence numbers defined within said separated packets.

* * * * *